United States Patent [19]

Carpenter et al.

[11] 4,351,605
[45] Sep. 28, 1982

[54] CONTROLLED VELOCITY TRANSPORT PRECESSION SYSTEM

[75] Inventors: Vance J. Carpenter; Eugene L. Yang, both of Fairport, N.Y.

[73] Assignee: Xerox Corporation, Stamford, Conn.

[21] Appl. No.: 262,353

[22] Filed: May 11, 1981

[51] Int. Cl.³ .......................................... G03G 15/28
[52] U.S. Cl. ..................................................... 355/8
[58] Field of Search .................. 355/8, 3 R, 11, 66

[56] References Cited

U.S. PATENT DOCUMENTS

| | | | |
|---|---|---|---|
| 3,454,335 | 7/1969 | Caldwell et al. | 355/8 |
| 3,650,621 | 3/1972 | Lewis et al. | 355/8 |
| 3,754,822 | 8/1973 | Melrose | 355/8 |
| 4,232,960 | 11/1980 | Glab | 355/8 |
| 4,285,590 | 8/1981 | Silverberg | 355/8 |

Primary Examiner—R. L. Moses

[57] ABSTRACT

An optical imaging system for scanning a document moving through an exposure zone. The imaging system comprises optical components including a mirror arrangement and a projection assembly for projecting reflected document images onto a flat portion of a photoreceptor. The optical components are stationary in a first mode of operation wherein documents are stream fed past the exposure zone at the process speed. In a second mode of operation, wherein multiple copies are made of the same document, the optical components are moved in a defined relationship so that the image is projected onto the photoreceptor in a direction opposite to the direction of photoreceptor motion. This form of image projection is termed image precession and results in additional time being available to replace the document at the start of scan portion without reduction in copy reproduction rate.

3 Claims, 1 Drawing Figure

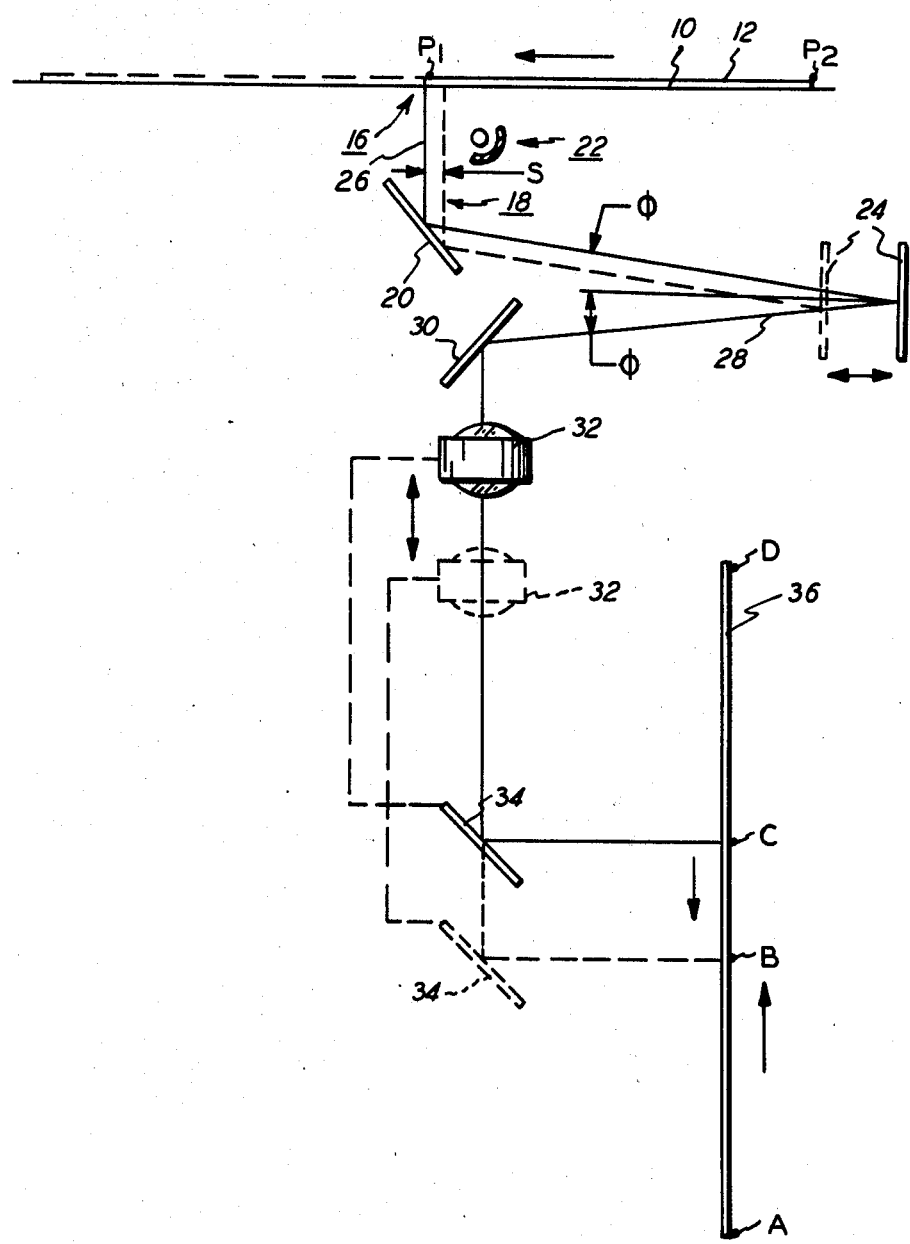

CONTROLLED VELOCITY TRANSPORT PRECESSION SYSTEM

BACKGROUND AND PRIOR ART STATEMENT

This invention relates generally to a document reproduction system and, more particularly, to an optical system in which a document is moved along an object plane through an exposure zone and a reflected image is projected onto a moving flat photoreceptor at a rate faster than the rate of movement of the photoreceptor and in the direction opposite such photoreceptor movement.

Precession scan systems which expose images on a photoreceptor at a faster rate than the photoreceptor movement known in the art. U.S. Pat. No. 3,454,335 (Caldwell) assigned to the same assignee as the present invention, discloses a method of projecting images on microfilm cards which are moved past a stationary lens and mirror system onto a drum photoreceptor. The drum and microfilm are moved at the same speed but the image is precessed, (i.e. moved in a direction opposite to the drum motion) onto the drum surface by means of a slit aperture which moves in a direction opposite that of the drum. This combined slit and drum rotation exposes the drum at a speed (rate) that is greater than the surface speed of the drum. This scanning system demonstrates two of the advantages gained by image precession: the process speed of the system can be set at a lower speed for equivalent copy rate (copies per minute) and the gap ordinarily present between images (due to the return time of the scan optics) can be reduced or eliminated if desired. Scan return velocities for a given copy rate can also be minimized for a given copy rate thus reducing scan accelerations, forces and vibrations. A problem with such a system, however, is that defocusing errors may result in developed images unacceptable for some systems. The errors are introduced because the image reflected from the drum mirror to the slit does not maintain perpendicularity to a tangential line at the drum surface.

This defocusing problem is addressed in U.S. Pat. No. 4,232,960 (Glab) assigned to the same assignee as the present invention. Glab solves the problem of field tilt in his particular scan system, by using linear and rotational motions of optical elements located near the drum surface to scan the image onto the drum at the angle corresponding to the angle of reflection of the image from the platen.

Another prior art device which utilizes precession onto a drum photoreceptor is disclosed in U.S. Pat. No. 3,650,621 (Lewis) also assigned to the same assignee as the present invention. Lewis discloses a system wherein an imaging device is moved in an arcuate path which is in a direction opposite to drum rotation to scan document on a curved platen onto the drum.

Precession onto a flat photoreceptor surface introduces different problems requiring a different set of solutions. U.S. Pat. No. 3,754,822 (Melrose) also assigned to the same assignee as the present invention, discloses a scan system wherein a platen and flat photoreceptor move synchronously in the same direction and the scan optics move in the opposite direction at a suitable speed. The disclosure and claims are limited to the specific system disclosed and do not address problems in systems which, for example, have a stationary object or which have a lens movement separate from that of a scan lamp movement. In higher volume copiers, a preferred method of scanning has been to utilize a full-rate, half-rate mirror system which maintains proper object-to-lens distance during the course of travel. Such a scan system is relatively heavy, however, and the above-mentioned flyback inertial problems constitute an important limitation on the speed of the surface.

Precession onto a flat photoreceptor surface is also disclosed in copending U.S. Application Ser. No. 190,160, filed Sept. 24, 1980, assigned to the same assignee as the present invention. In this application, an object is imaged onto a photoreceptor by an illumination scanning system which is moving at a faster rate than the photoreceptor.

Another variation of precessing an image onto a flat photoreceptor is disclosed in copending U.S. Application Ser. No. 237,032, filed Feb. 23, 1981, assigned to the same assignee as the present invention. In this application, a fixed document lying in an object plane is scanned by a modified dual rate mirror system where the second (slower) mirror is moving at less than half the speed of the first (scan) mirror thereby causing a resultant decrease in platen-to-lens distance. This decrease is compensated for, and image precession obtained, by moving a projection lens and associated mirror along the optical axis in a direction opposed to that of the photoreceptor.

None of the above-disclosed systems have utilized an image system wherein a document to be copied is moved along an object plane through an exposure zone. This type of system, referred to as a controlled velocity transport (CVT) system, is relatively efficient where a plurality of documents are stream fed past the exposure zone. Where, however, a number of copies of a single document are needed, there exists a recovery time factor associated with recirculating the document back to the start of scan position after the completion of an exposure cycle. One of the advantages of a precession imaging system as described in the above references is to relax return scan component velocity requirements. By analogy, a precession system can also be usefully employed in a CVT system to compensate for the time taken to return a document to a start of scan position. The present invention provides such a precession scheme by fixing in place a first scan mirror and by moving a lens and mirror arrangement along an optical path away from the object plane so as to project images onto a moving photoreceptor in a direction opposite to the photoreceptor movement. The platen to lens optical distance is held constant by moving a second mirror, placed between the scan mirror and lens, toward the scan mirror. The lens and second mirror are moved at rates derived according to one of the principles of the invention.

In one embodiment wherein documents are copied in both a stream fed mode and a repeat mode, an efficient dual speed document system is further disclosed.

The FIGURE is a schematic diagram of a precession scan and imaging arrangement for a CVT system.

DESCRIPTION

Referring now to the FIGURE, there is shown a 1:1 precession imaging system wherein a document 10 is moved through an object plane 12 at some absolute speed $V_{CVT}$ by means not shown. Document 10, which has a scanned length defined by points $P_1P_2$, moves past an exposure zone 16 defined by a fixed mirror/lamp assembly 18 consisting of a first mirror 20 and a lamp assembly 22. A second mirror 24 is adapted for movement towards and away from mirror 20 at a velocity Vm2. An image of the document object points, represented by principal ray 26 traveling along optical path 28, is reflected by mirror 20 towards mirror 24. The ray strikes mirror 24 at an angle $\phi$ with respect to the mirror normal which is parallel to the object plane. The ray is reflected from moving mirror 24 and folding mirror 30 into lens 32. Lens 32 and photoreceptor mirror 34 are movable along the optical path at a velocity $V_L$ in the indicated direction.

The projected image is reflected onto photoreceptor belt 36 moving at $V_B$. Where document 10 is the first of a series of documents which are to be stream fed across the platen, all the elements remain in their solid line position and the document scan velocity $V_s$ is equal to the belt or process velocity $V_B$. That is, under the first, stream-fed mode of operation, $$V_{CVT} = V_s = V_B; V_L = 0, Vm2 = 0.$$

Where multiple copies of document 10 are required, there is a recovery time introduced, which is that time required to recirculate document 10 back to the start of scan position after completion of a scan. For this condition, a second precession mode of operation is provided wherein the lens 32, mirror 34 combination and mirror 24 are given velocities according to the following relationships:

$$V_L = (-2Vm2) \cos \phi \quad (1)$$

and $$V_B = V_s - V_L. \quad (2)$$

In this second mode of operation and at the start of scan, document 10 and components 24, 32 and 34 are in their solid line position. A portion AC of belt 14 is equal in length to document points $P_1P_2$ with point C defining the image point of document point $P_1$. Document 10 moves from right to left to yield a scan velocity $V_s$ relative to the scan point. Mirror 24 moves from right to left at velocity Vm2 increasing the platen to lens distance. To compensate for this decrease, and also to implement the precession imaging, lens 32 and mirror 34 are moved at velocity $V_L$. The projected image is "walked" along belt 14 (precessed) in a direction opposite to that of the belt. At the end of scan time $T_s$, the document, and all the movable components are in their dotted line positions. Belt 14 has moved to position BD with document point $P_2$ being imaged at point B. The precession distance BC divided by precess velocity $V_B$ provides an added increment of "free" time. The document 10 can be returned to its initial start of scan position during the time the belt travels at least to the point C. The values of precession distance BC can be varied by changing the relationships between Vm2, $V_L$ and $V_B$. As shown in the figure, the scanned point on the document "walks" along mirror 20 and hence along the object plane a distance S over the length of scan. This distance S is given by the expression:

$$S = 2Vm2 Ts \sin \phi \quad (3)$$

And, due to the scanned point "walk", the absolute speed of the document $V_{CVT}$ is given by the expression:

$$V_{CVT} = V_s + S/Ts \quad (4)$$

EXAMPLE

For the system shown in the figure, assume the following system values:
Copy output = 40 cpm (40 scans/minute)
$P_1P_2 = 10''$
$BC = 4''$
$V_L = 5''$/sec
$Ts = 0.8$ sec
$V_B = 7.5''$/sec
$\phi = 10°$ These assumptions lead to the simultaneous solution of Equations (1) to (4):
$V_s = 12.5''$/sec
$V_{M2} = 2.54''$/sec
$S = -0.71''$
$V_{CVT} = 11.62''$/sec In conclusion, it may be seen that there has been disclosed a novel optical imaging system. The exemplary embodiment described herein is presently preferred, however, it is contemplated that further variations and modifications within the purview of those skilled in the art can be made herein. For example, the document may be carried along on a moving platen, or the document may be moved along the surface of a fixed platen. The following claims are intended to cover all such variations and modifications as fall within the spirit and scope of the invention.

What is claimed is:
1. An optical system for scanning a document moving through an exposure zone in an object plane at some absolute speed $V_{CVT}$ and projecting light images of said document along an optical path onto a flat portion of a photoreceptor moving through an image plane at a process velocity $V_B$, said system including
an illumination source for providing a band of illumination at said exposure zone,
a first, stationary mirror reflector positioned adjacent said exposure zone and in said optical path to direct reflections from said illuminated portion of the document onto a second mirror at an incident angle $\phi$ measured with respect to the mirror normal which is parallel to said object plane, said second mirror adapted for movement towards said first mirror,
a projection means positioned along the optical path and adapted for translation along said optical axis to project light images reflected from said second mirror onto said photoreceptor,
said optical system having a first mode of operation wherein said second mirror and said projection means remain stationary and wherein $V_{CVT}$ = document scan velocity Vs = $V_B$ and a second mode of operation wherein said second mirror moves towards said first mirror at a velocity Vm2 and said projection means moves along the optical path at a velocity $V_L$ so as to project said light images onto said photoreceptor in a direction opposite to said photoreceptor motion, said movements governed by the following relationships:

$$V_L = (-2Vm2) \cos \phi, V_B = V_s - V_L$$

and $$V_{CVT} = V_s + 2Vm2 \sin \phi.$$

2. The optical system of claim 1 wherein said projection means includes a projection lens and a following mirror, said lens and said mirror moving as an assembly at said velocity $V_L$.

3. The optical system of claim 2 further including a folding mirror between said second mirror and said projection lens.

* * * * *